Jan. 12, 1965 R. C. THOR 3,165,741

PHASE STABLE MULTI-CHANNEL PULSE COMPRESSION RADAR SYSTEMS

Filed Dec. 29, 1961 3 Sheets-Sheet 1

INVENTOR:
ROBERT C. THOR,
BY Dudley T. Ready
HIS AGENT.

PHASE STABLE MULTI-CHANNEL PULSE COMPRESSION RADAR SYSTEMS

Filed Dec. 29, 1961 3 Sheets-Sheet 2

INVENTOR:
ROBERT C. THOR,
BY Dudley T. Ready
HIS AGENT.

Jan. 12, 1965 R. C. THOR 3,165,741

PHASE STABLE MULTI-CHANNEL PULSE COMPRESSION RADAR SYSTEMS

Filed Dec. 29, 1961 3 Sheets-Sheet 3

INVENTOR:
ROBERT C. THOR,

BY Dudley J. Heady

HIS AGENT.

3,165,741

PHASE STABLE MULTI-CHANNEL PULSE COMPRESSION RADAR SYSTEMS

Robert C. Thor, Liverpool, N.Y., assignor to General Electric Company, a corporation of New York Filed Dec. 29, 1961, Ser. No. 163,197
5 Claims. (Cl. 343—17.2)

The invention is directed to an improved pulse compression radar system in which pulse compression circuitry comprised of several parallel channels of pulse processing filter networks is provided while insuring proper phase matched operation over the frequency spectrum covered by all of the channels.

The radar systems considered here are within the class of systems which are generally referred to as "pulse compression" radar. Pulse compression radar includes radar systems incorporating active or passive pulse processing circuitry that provides special pulse waveforms for radar transmission which in turn have large time-bandwidth products and reprocess the received echo pulses for appropiate utilization such as for data display. Pulse compression techniques are advantageous in that they greatly increase system efficiency by maximumizing the range, range resolution, and velocity resolution. This is achieved essentially by the increased information content inherently associated with the greatly increased time-bandwidth product of the transmitted pulse. In some respects, pulse compression radar operation can be considered as synthesizing a very short R.-F. pulse (with its inherent high frequency components) by providing appropriate frequency components expanded over a relatively long pulse period. Perhaps the clearest advantage lies in the drastic reduction of peak power requirements for a large bandwidth pulse.

There are substantial variations in the selection of possible pulse compression circuitry. However, the invention is directed to the practical class of passive pulse synthesis and compression circuitry disclosed in the IRE Transactions on Military Electronics, April 1961 ("Principles of Pulse Compression" by H. O. Ramp and E. R. Wingrove). In these systems, the transmitted pulse is formed by processing a very short pulse through passive circuitry which introduces a parabolic phase dispersion function in respect to frequency. The received echo pulse is processed in accordance with an inverse parabolic phase dispersion function which synchronizes the phases of the frequency components. This process effectively provides a linear frequency modulation of the short duration pulse before transmission and linear frequency demodulation after reception. Phase states should be preserved to permit accurate reconstitution of the original pulse and thus timing accuracy.

This type of passive pulse compression system has been found to provide excellent phase stability for single channel operation. However, it has been found to be very advantageous to utilize embodiments of the parabolic phase dispersion circuits having a plurality of channels. These system embodiments are characterized by greatly increased pulse compression ratios, that is to say, greater time-bandwidth products. In fact, it has been found that the time-bandwidth product of a system is proportional to the square of the number of channels.

In implementing these multi-channel pulse compression systems, it has been found that there are stringent requirements upon the phase stability of the equipment to insure the phase synchronization of the frequency components at the outputs of all the channels. The synchronization requires that each signal component must be processed through a pulse synthesis channel, transmitter circuit, receiver circuit, pulse compression channel (generally different from the pulse synthesis channel) with a phase variation within a given range, typically ±0.1 radians, of a predetermined value over the entire transmitted frequency spectrum. This phase matching is necessary because the compressed output is formed by adding all the frequency components together and they will not form the desired single spike pulse without synchronization.

The realization of phase stability of this order is difficult. As a prime example of the difficulties encountered, it is noted that delay lines of one system embodiment required temperature control of within ±0.01° C. By use of the invention, system constraints of this order are avoided.

Accordingly, it is an object of the invention to provide a multi-channel pulse compression radar system which incorporates automatic phase synchronization.

It is a further object of the invention to provide a multi-channel pulse compression radar system in which phase instability of individual components can substantially exceed the overall phase synchronization requirements.

Briefly stated, in accordance with one aspect of the invention, a multi-channel pulse compression radar system is provided which utilizes the channel to channel phase fitting arrangement including the individual channel mixers and the associated phase shifters to introduce an additional phase shift which compensates for phase instability of individual components. The amount of compensation is determined by a comparison with a reference signal of a synthesized zero range echo pulse after pulse compression.

The features of the invention which are believed to be novel are set forth with particularity in the appended claims. The invention itself, however, both as to its organization and method of operation, together with further objects and advantages thereof, may best be understood by reference to the following description when taken in connection with the drawings, wherein:

Figure 1:
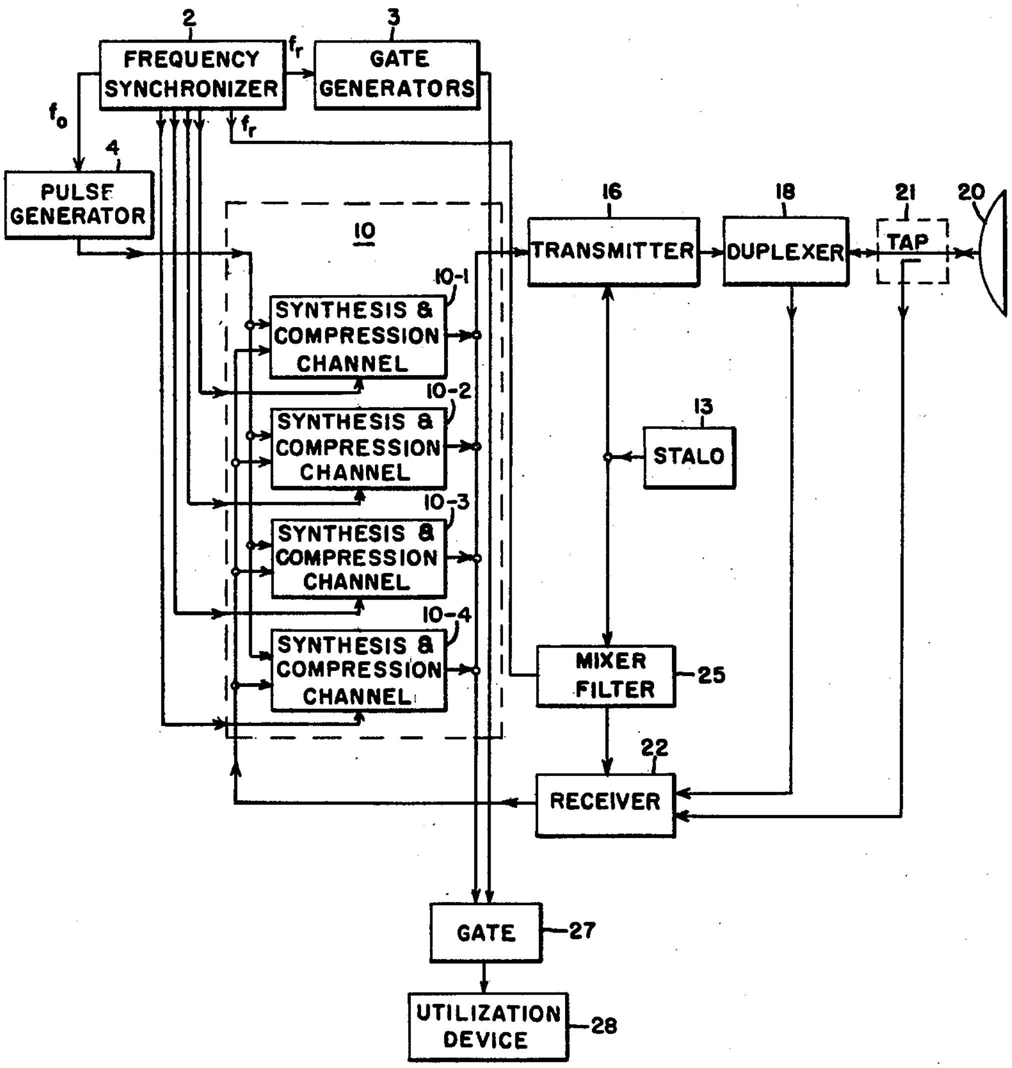
FIGURE 1 is a block diagram of a multi-channel pulse compression radar system with automatic phase synchronization.

Referring now to the drawings and FIGURE 1 in particular, a multi-channel pulse compression radar system is illustrated. The transmitting portion of the system is comprised of R.-F. pulse generator 4 coupled to a frequency synchronizer 2 that provides the reference frequency signals for the system, parallel pulse synthesis channels 10, transmitter circuit 16, duplexer 18, and antenna 20. The receiving portion of the radar system is comprised of antenna 20, duplexer 18, receiver circuit 22, pulse compression channels 10 (having parts common to the pulse synthesis channels), and a utilization device 28. A tap element 21 is also provided on the output of transmitter 16 to produce a simulated zero range echo pulse.

The pulse generator 4 provides a very short duration R.-F. pulse, conveniently by means of a conventional blocking oscillator which gates a reference signal at $f_0$ from frequency synchronizer 2, typically with a one-half microsecond duration. The pulse is applied coherently to the pulse synthesis and compression network 10 which is comprised of a plurality of parallel channels (of which four are illustrated), such as the representative channel 10–*n* in FIGURE 2, that introduce time delays and appropriate phase dispersion and frequency conversion in accordance with the pulse compression operation. The synthesized pulse with the pulse compression waveform is then transmitted by conventional radar apparatus. The transmitter 16 converts up the frequencies of the synthesized pulse in accordance with the stable local oscillator 13. The synthesized pulse after frequency conversion is also amplified in transmitter 16 and coupled to antenna 20 through duplexer 18.

Echo pulses received by antenna 20 are detected by receiver 22 after passing through duplexer 18. Receiver 22 converts down the frequencies of the received echo pulse. The stable local oscillator 13, by means of mixer filter 25 which is coupled to the $f_r$ output of frequency synchronizer 2, provides a local oscillator signal for mixing which produces frequency inversion of the received pulse. The output of receiver 22 is applied to the pulse synthesis and compression network 10 which processes the pulses for pulse compression and applies the output to utilization device 28. The pulse compression network 10 is comprised of a plurality of channels, each channel being responsive to a band of the received pulse spectrum. Each channel includes linear time delay and phase dispersive elements which are common to both the pulse synthesis channel and the pulse compression channel. Because of the frequency inversion introduced by receiver 22, the bands of the pulse spectrum are applied to a pulse compression channel which provides a complementary phase dispersion in respect to the corresponding pulse synthesis channel to reconstitute the original phase relationships in that channel. The synthesized zero range echo pulse tapped off by element 21 is also applied to the pulse compression network 10 in the same manner as the actual received echo pulses. Appropriate gating arrangements in the network 10 distinguish between the pulses and provide the necessary phase synchronization networks and gate 27 isolates the utilization device 28 from the simulated zero range signal. The synthesized zero range signals may be obtained by a wide variety of techniques. As illustrated, a separate element 21, conveniently a conventional directional coupler, taps off a portion of the transmitted signal. Similarly, the direct leakage signal from duplexer 18 may be employed. It is not necessary that the synthesized signal utilized for synchronization be a zero range signal. The essential requirement is that the signal have a fixed occurrence in time. Accordingly, signals provided by ground clutter can also be used for synchronization.

Figure 2:
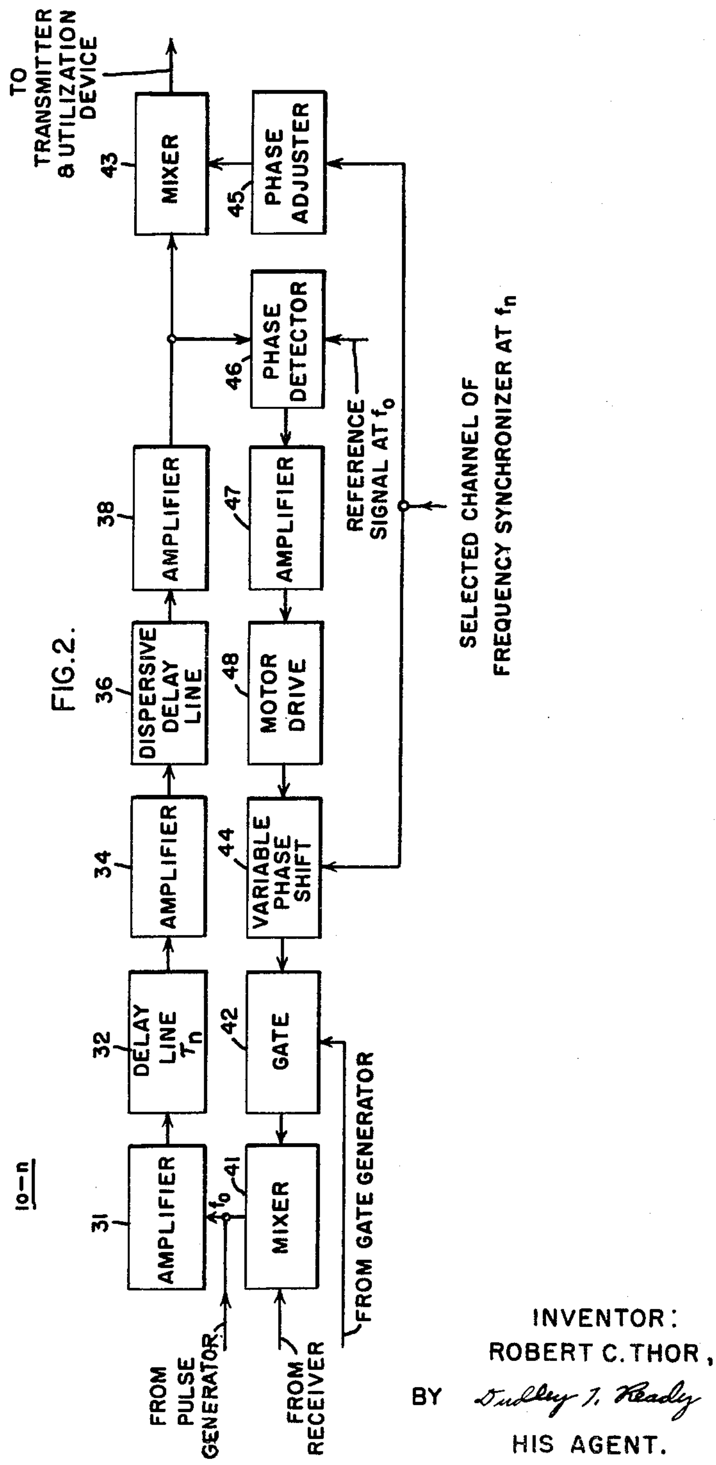
FIGURE 2 is a block diagram of a representative pulse synthesis and pulse compression channel 10–*n* in the FIGURE 1 system.

FIGURE 2 is a block diagram of a representative pulse synthesis and pulse compression channel 10–*n* included in the pulse synthesis and compression network 10 of FIGURE 1. The pulse synthesis input signal from pulse generator 4 is applied to an amplifier 31 having a narrow bandwidth about the center frequency $f_o$ which is the same for all channels. (The band of frequencies within each channel is later translated in frequency to the appropriate portion of the frequency spectrum.) The amplifier 31 drives delay line 32 which is a non-dispersive element that provides a fixed delay $\tau_n$ to the R.-F. pulse band such as a conventional quartz delay line. The delay $\tau_n$ is selected to stagger the outputs of the plural channels in time to provide a contiguous relationship in time (after expansion) and to perform the first step of the desired phase dispersion of the pulse. Since the phase is a linear function of time $\tau_n$ and the frequency of the component, the delay line 32 introduces a linear phase delay. The output of delay line 32 is then applied to an amplifier 34 which drives a dispersive delay line 36. The dispersive delay line 36 is characterized by a non-linear relationship between the phase and the frequencies of the applied band of frequency components. This element is therefore adjusted to introduce a parabolic phase dispersion as a function of frequency. The output of dispersive delay line 36 provides a segment of the synthesized pulse and is applied to mixer 43 after amplification in amplifier 38. In order to translate the band of frequencies within each channel into a channel to channel contiguous fit in the frequency domain, mixer 43 is coupled to the appropriate frequency tap $f_n$ of frequency synchronizer 2 through phase adjustor 45. Phase adjustor 45 introduces a phase shift in the reference frequency signal $f_n$ to provide channel to channel phase matching in the mixer output. The phase adjuster 45 may conveniently take the form of a transmission line of appropriate length. The mixer 43 converts the frequencies of the applied band of frequencies of the channel to the appropriate position in the pulse spectrum whereby the outputs of all the channels are arranged in a staggered, contiguous relationship with an overall bandwidth corresponding to the sum of the *n* channel bands. This arrangement of the frequency components is obtained by the application of the appropriate local oscillator frequency $f_n$ to the mixer 43. The output of mixer 43 is applied to the transmitter 16.

The received echo pulses after being processed through receiver 22 are applied to each channel of the pulse compression network such as mixer 41 and channel 10–*n*. The mixer 41 converts the frequencies of the applied pulse so that the appropriate band of frequencies is converted down to the frequency band about $f_o$ utilized for pulse synthesis. This is obtained by frequency conversion with the appropriate local oscillator frequency $f_n$ and the application of the resulting signal to the band pass amplifier 31. The frequency conversion steps between pulse synthesis and the application of the received echo pulse to amplifier 31 introduce a frequency inversion about the center of the transmitted pulse spectrum. Because of this, the portions of the received pulse processed by the respective channels are in the reverse order relative to the originating pulse synthesis channels. Accordingly, the respective channels introduce a complementary phase dispersion to that introduced in pulse synthesis and the resulting output from amplifier 38 is a compressed pulse, the time duration of which is the reciprocal of the single channel bandwidth. However, the output of amplifier 38 is applied to a mixer 43 which introduces a frequency conversion which is the inverse of the frequency conversion introduced by mixer 41 and accordingly restores the broad band frequency information of the pulse and in this form is applied to a utilization device 28. The N-band compressed pulse is formed by the adding together of the outputs of all the individual channels. Its time duration is the reciprocal of the *n*-band or total signal bandwidth.

To insure proper phase match between channels, appropriate phase shifts are introduced in the respective channels. This adjustment is automatic and utilizes a simulated zero range signal derived by tapping off a portion of the transmitted signal by means of the tapping element 21 of FIGURE 1. The simulated zero range signal is applied to the channels such as 10–*n* in parallel through mixer 41. These signals are processed for inverse phase dispersion in the same manner as any echo pulses. These pulses are essentially replicas of the pulses from pulse generator 4. The compressed pulse is appropriately gated to adjust the phase shift introduced in the channel. This is obtained by comparing the output of amplifier 38 with the reference frequency source at $f_o$ in the phase detector 46. The output of phase detector 46 is amplified in amplifier 47 which operates motor drive means 48 to adjust the variable phase shift element 44. With this arrangement, an additional phase shift is introduced in variable phase shift element 44 to insure the proper phase synchronization in the outputs of the pulse compression channels as applied to the utilization device 28. The variable phase shift can be introduced in the channel at a later point in the pulse processing network. However, phase synchronization is most easily obtained during mixing.

Phase synchronization only requires that the outputs of the various channels be synchronzied within a fraction of a cycle. It is permissible for the outputs to incorporate erroneous phase shifts which are exact multiples of 2 $\pi$ radians. Such variations do not significantly affect the addition of the channel output signals. Accordingly, the phase detector 46 in each channel only makes a fine comparison of the output signal from amplifier 38 with the reference signal at $f_o$.

Instrumentation of the pulse compression radar system illustrated in FIGURES 1 and 2 is straightforward. The components of the pulse compression circuitry are conveniently those disclosed in the patent application Serial No. 706,048, "Radar Systems," by Robert C. Thor and Earl R. Wingrove, Jr. filed December 30, 1957 and assigned to the same assignee. However, temperature stability and other properties are improved by the use of very thin filamentary wires or flat strips in which the wire or strip acts as an acoustic waveguide for the dispersive delay line 36 in FIGURE 2. For a range of frequencies where the wavelength is about equal to the wire diameter or thickness, the relationship of group delay to frequencies is closely linear. Therefore, by a proper choice of dimensions, a dispersive delay line having the desired phase dispersion is provided. Also, all pass filter networks may be employed to provide the phase dispersion. Any known components which perform the requisite functions may be utilized for the system components. For example, a saturable core type of electronic phase shifter responsive to a D.-C. control signal from the phase detector 46 can be used to introduce the phase synchronization in the pulse synthesis and compression channels 10–$n$. A typical variable phase shift device suitable for providing phase correction is the "Helidel" manufactured by Beckman Instruments, Inc. and described in U.S. Patents Nos. 2,799,007 and 2,810,887. The phase detector can take the form of conventional phase detectors such as those described in vol. 21, "Electronic Instruments" of the Radiation Laboratory Series and illustrated in FIGURES 12.15($e$) and ($f$).

Figure 3:
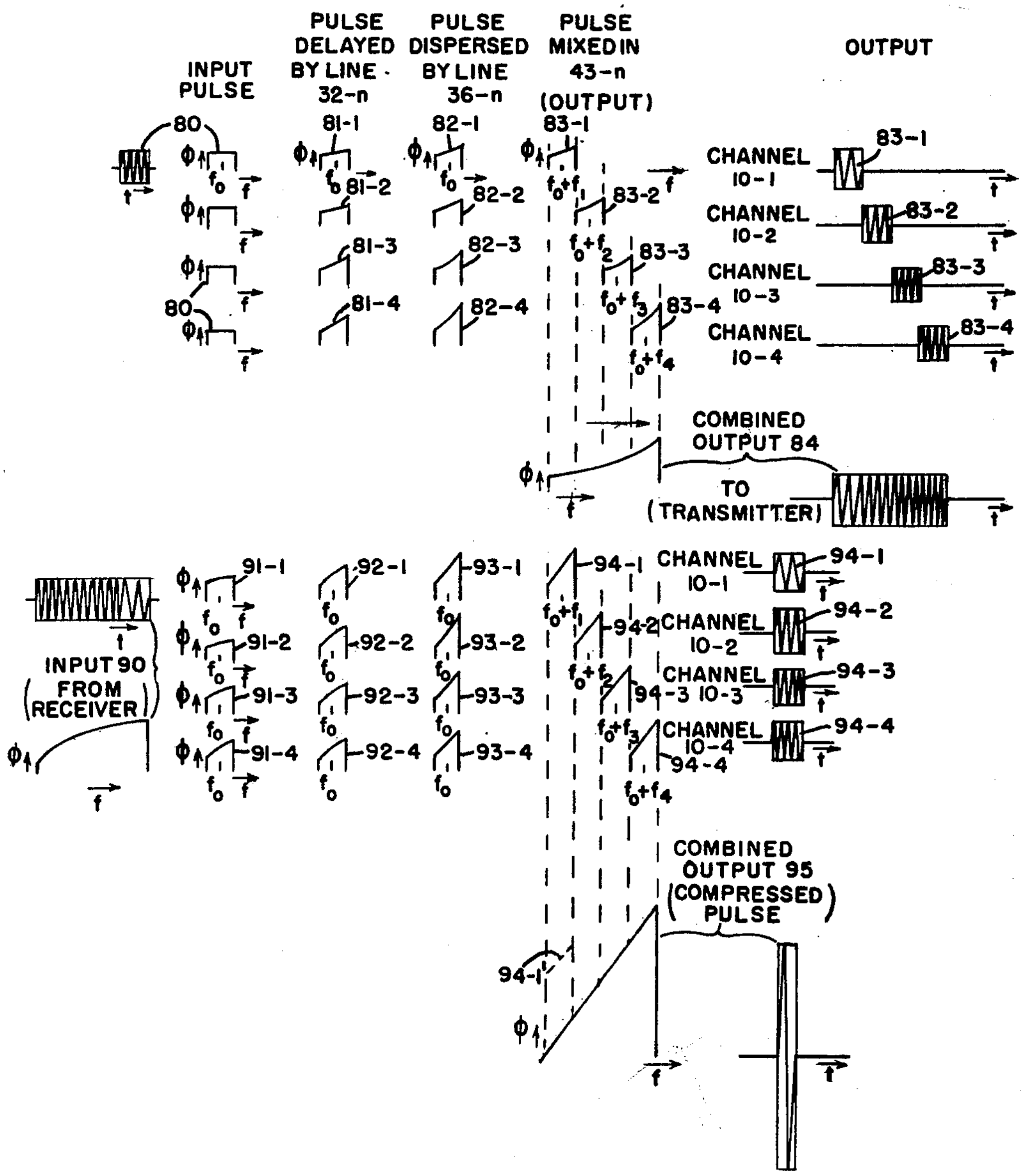
FIGURE 3 is a set of idealized diagrams illustrating the operation of the FIGURE 1 radar system.

The operation of the pulse compression radar system of FIGURES 1 and 2 may be considered in connection with the diagrammatic illustration of the pulse processing steps in FIGURE 3. The R.-F. pulse 80 from pulse generator 4 is coherently applied to all the parallel pulse synthesis channels 10–1 to 10–4. The pulse 80 is illustrated as comprised of a few sinusoidal cycles representative of several cycles, typically a 30 megacycle signal for 0.5 microseconds. The phase-frequency spectrum of the pulse is illustrated for all stages of the pulse processing because the relations of the phase to the frequency components of the processed pulse generally present the most significant characteristics of system performance.

The pulse 80 is delayed by the respective delay lines 31–1 to 31–4 to provide the delayed pulses 81–1 to 81–4. These pulses are delayed by fixed times, $\tau_n=(n-1)T_o$, where $T_o$ is the duration of the pulse appearing at the channel output, so that the pulses 81–1 to 81–4 are staggered in time. The delay lines are nondispersive, providing in each channel the same time delay for all frequency components, whereby a linear phase-frequency spectrum segment results as illustrated for each channel.

The delayed pulses 81–1 to 81–4 are further modified by the dispersive delay lines 36–1 to 36–4 to provide segments of the desired parabolic phase dispersion in pulses 82–1 to 82–4. Accordingly, the dispersive delay lines 36–1 to 36–4 are selected to provide the appropriate nonlinear phase-frequency functions for the respective channels. Each dispersive delay line 36–$n$ therefore has a particular parabolic phase-frequency response which together with the linear phase-frequency response of the respective nondispersive delay line 31–$n$ produces a segment 82–$n$ of a parabolic phase-frequency spectrum corresponding to a portion of the desired parabolic spectrum.

The pulses 82–$n$ are applied to mixers 43–$n$ to translate the pulse frequencies to their appropriate positions in the desired waveform spectrum as represented by pulses 83–$n$. The mixers accordingly perform two functions. They convert the pulse frequencies in each channel by heterodyning the pulse with respective reference signals $f_n$ and adjust the phase of the output pulses from each channel to insure phase fit in the processed received pulse by introducing the appropriate phase shift in the applied reference signal $f_n$.

When the outputs of all the parallel pulse synthesis channels are combined, the resulting pulse 84 has the desired parabolic phase dispersion. The pulse 84 having a parabolic or second order phase dispersion is equivalent to a linearly frequency modulated R.-F. pulse. The pulse 84 is also characterized by having a duration which is the duration of generated pulse 83–$n$ multiplied by the number of channels and by having a frequency bandwidth which is the sum of the bandwidths of the contiguous channels. The pulse 84 is applied to the radar transmitter where it is mixed and amplified by any suitable radar apparatus.

The echo pulse 90 which is the output of receiver 22 is applied to all the parallel pulse compression channels. Since the stable local oscillator signal is mixed with the reference signal $f_r$ (twice $f_o$) to provide the heterodyning signal for the receiver, the pulse 90 is formed by the lower sideband which results in frequency inversion of the pulse compression frequency components. This frequency inversion is accompanied by phase inversion to produce the pulse 90. Since each channel has a narrow pass band, only a portion 90–$n$ of the pulse spectrum is represented as applied to the respective channels 10–$n$.

The pulse 90 is applied to the respective mixers 41 whereby the desired band of pulse frequencies 91–$n$ are provided. The pulse spectrum 90 is translated by frequency conversion with the respective reference signals $f_n$ which are the same signals used in pulse synthesis. Accordingly, the pulses 91–$n$ all have the same center frequency $f_o$ which is the center frequency for both the pulse synthesis and pulse compression channels. The mixer 41–n also introduces a phase shift in the output pulse 91–n which adjusts for undesired phase shifts introduced by phase instabilities in the components. This phase shift is introduced by providing the necessary phase shift in phase shifter 44. The phase shifter 44 is adjusted in accordance with the phase detector 46 which insures phase synchronization of the pulse compression channel outputs by actual comparison thereof with the reference signal $f_o$.

The pulses 91–$n$ are processed by nondispersive delay lines 32–$n$ and dispersive delay lines 36 to produce respectively pulses 92–$n$ and 93–$n$. These delay lines have the same phase response effects as in pulse synthesis. However, because of the frequency inversion, the pulse segments processed in each pulse compression channel originated in a reciprocally related channel in pulse synthesis so that the phase dispersion in pulse compression is complementary to the pulse synthesis phase dispersion. Accordingly, the outputs of the dispersive delay lines 36–$n$ will all be in phase.

The pulses 93–$n$ are processed by the respective mixers 43–$n$ in order to form the pulses 94–$n$ which are translated back to the proper position in the frequency spectrum which covers the same range of frequencies of the pulses 90–$n$ which are applied originally to the pulse compression channels 10–$n$. The reference frequencies $f_n$ which are applied to the mixers 43–$n$ are accordingly the same signals as were applied to the mixer 41. The adjustable phase shifter element 45–$n$ is adjusted to introduce a phase shift which assures proper phase alignment of the pulse compression channels. When the outputs of the pulse compression channels are combined they add together to form the spike R.-F. pulse 95 which is the desired compressed pulse output.

As is evident, it is essential that the channel outputs be synchronized in order to form the desired spike output. To insure this synchronization, the output of each dispersive delay line 36–$n$ as it appears in the output of amplifier 38–$n$ is gated to pass the simulated zero range signal to phase detector 46–*n* which controls variable phase shift element 49 in such a manner that the output of the individual channels are synchronized with the reference signal $f_0$ which is applied to phase detector 46. Accordingly, when a fixed phase error is introduced in an individual channel such as to produce an improper phase shift as at 94–1′, the variable phase shifter element 49 introduces the appropriate phase correction.

While the fundamental novel features of the invention have been shown and described as applied to illustrative embodiments, it is to be understood that all modifications, substitutions and omissions obvious to one skilled in the art are intended to be within the spirit and scope of the invention as defined by the following claims.

What is claimed is:

1. In a multi-channel pulse compression radar system, automatic phase stabilizing apparatus comprising:

(*a*) a plurality of expanded pulse synthesis and compression channels adapted to be coupled in parallel to a source of R-F pulses to provide an overall even order phase dispersion of said R-F pulses for pulse synthesis and adapted to process echo pulses for pulse compression, each channel including, (1) a passive network responsive to said R-F pulses to provide approximate even order phase dispersion, (2) a first mixer coupled to said passive network for frequency conversion of said segment of frequencies to provide a contiguous channel to channel fit of the respective segments, (3) a first phase shifter having applied thereto a local oscillator signal coupled to said first mixer for introducing an appropriate phase shift in the local oscillator signal applied to said first mixer to insure a channel to channel phase match, (4) a second mixer responsive to received echo pulses and having the output coupled to said passive network for frequency conversion of the appropriate band of the echo pulse frequency spectrum in order to enable complementary pulse compression processing, (5) a second phase shifter having applied thereto said local oscillator signal coupled to said second mixer and said passive network for introducing a phase shift in the local oscillator signal applied to said second mixer which is complementary to the phase shift introduced in said first phase shifter and compensates for the phase shifts introduced by component phase instability; and (*b*) utilization means adapted to receive the outputs of said channels additively to produce the compressed echo pulses.

2. In a multi-channel pulse compression radar system, automatic phase stabilizing apparatus comprising:

(*a*) a plurality of expanded pulse synthesis and compression channels adapted to be coupled in parallel to a source of R-F pulses to provide a parabolic phase dispersion of said R-F pulses for pulse synthesis and adapted to process echo pulses, each channel including, (1) a nondispersive delay element responsive to said R-F pulses to provide a linear phase delay to said pulse as a function of frequency, (2) a dispersive delay line coupled to said delay element to provide parabolic phase dispersion, (3) a first mixer coupled to said dispersive delay line for frequency conversion, (4) a first phase shifter having applied thereto a local oscillator signal coupled to said first mixer for introducing an appropriate phase shift in the local oscillator signal applied to said first mixer to insure a channel to channel phase match, (5) a second mixer responsive to received echo pulses and having the output coupled to said dispersive delay line for frequency conversion of the appropriate band of the echo pulse frequency spectrum in order to enable complementary pulse compression processing, (6) a second phase shifter having applied thereto said local oscillator signal coupled to said second mixer for introducing a phase shift in the local oscillator signal applied to said second mixer which is complementary to the phase shift introduced in said first phase shifter and compensates for the phase shifts introduced by component phase instability, and (7) comparator means coupled to said nondispersive delay line and a system reference signal to adjust said second phase shifter in accordance with a simulated zero range signal by detecting phase differentials within $\pm\pi$ radians; and (*b*) utilization means adapted to receive the outputs of said channels additively to produce the compressed echo pulses.

3. A phase stable multi-channel pulse compression radar system comprising:

(*a*) a source of short duration R-F pulses;

(*b*) a plurality of expanded pulse synthesis channels coupled in parallel to said source of R-F pulses and responsive thereto to provide, by a nonlinear passive response, a parabolic phase dispersion over a band of frequencies as a function of pulse frequency, each channel including (1) a passive network responsive to said R-F pulses to provide the parabolic phase dispersion, (2) a first mixer coupled to said passive network for frequency conversion of said band of frequencies to provide a contiguous channel to channel fit of the respective bands, and (3) a first phase shifter having applied thereto a local oscillator signal coupled to said first mixer for introducing an appropriate phase shift in the local oscillator signal applied to said first mixer to insure a channel to channel phase match;

(*c*) a radar transmitter coupled to said parallel pulse synthesis channels for tranmsitting said synthesized pulses;

(*d*) a radar receiver responsive to echo pulses to amplify and process said pulses in a manner reciprocal to radar transmission;

(*e*) a plurality of pulse compression channels coupled in parallel to said receiver and responsive thereto to provide a parabolic phase dispersion inverse to the pulse synthesis, each channel including, (1) a second mixer responsive to said received echo pulses for frequency conversion of the appropriate band of the pulse frequency spectrum in order to enable inverse channel by channel pulse processing, (2) a second phase shifter coupled to said second mixer for introducing a phase shift compensatory to the phase shift introduced by said first phase shifter, (3) a passive network coupled to said second mixer to provide the inverse parabolic phase dispersion;

(*f*) means to tap off a portion of the transmitted signal simulating a zero range echo signal and to apply said simulated signal to said receiver;

(*g*) a plurality of phase comparator means including gating means coupled to the output of each respective pulse compression channel and a reference signal source to provide an output signal representative of the phase differential of the simulated zero range signal, said phase comparator means being coupled to a respective said second phase shifter to introduce an additional phase shift compensatory to component phase instability; and (*h*) utilization means coupled to said plurality of parallel pulse compression channels.

4. In a multi-channel pulse compression radar system in which each channel includes a dispersive delay line for producing a phase dispersion response to an impulse R-F signal suitable for pulse synthesis and pulse compression operation and a channel mixer for providing the desired frequency and phase fit between channels comprising:

(*a*) means for tapping off a portion of the transmitted radar signal equivalent to a zero range target return and applying said portion to the radar receiver for channel by channel pulse compression;

(*b*) a plurality of channel phase detectors, each phase detector being responsive to the output of a respective channel dispersive delay line and a reference phase signal to provide an output signal representative of phase error in processed zero range target return; and (*c*) a plurality of variable phase shift means responsive to respective phase detectors for introducing an error compensating phase shift in the respective pulse compression mixer of each channel.

5. A multiple channel pulse synthesis and compression system comprising:

(*a*) means to distrbute the original signal into the individual channels and to provide differentiated phase dispersive delays therein suitable for pulse compression operation;

(*b*) means to recombine the signals from the various channels; and (*c*) means to sense the phase relationships between the signals of adjoining channels and to adjust the phase relationships so as to bring the channel signals into phase match at the channel boundaries.

References Cited by the Examiner

UNITED STATES PATENTS

| | | | |
|---|---|---|---|
| 2,942,203 | 6/60 | Winkler | 331—2 |
| 2,957,948 | 10/60 | Edson | 179—15.55 |
| 3,090,953 | 5/63 | Frank | 343—17.1 |

CHESTER L. JUSTUS, *Primary Examiner.*

KATHLEEN CLAFFY, *Examiner.*